(12) United States Patent
Qin et al.

(10) Patent No.: US 8,298,671 B2
(45) Date of Patent: Oct. 30, 2012

(54) PHOTOCHROMIC POLYURETHANE LAMINATE

(75) Inventors: Xuzhi Qin, Hacienda Heights, CA (US); Hideyo Sugimura, North Oaks, MN (US); Michael S. Boulineau, Forest Lake, MN (US)

(73) Assignee: Insight Equity, A.P.X, LP, Ramsey, MN (US)

( * ) Notice: Subject to any disclaimer, the term of this patent is extended or adjusted under 35 U.S.C. 154(b) by 150 days.

(21) Appl. No.: 10/938,275

(22) Filed: Sep. 9, 2004

(65) Prior Publication Data

US 2005/0233153 A1    Oct. 20, 2005

Related U.S. Application Data

(60) Provisional application No. 60/501,820, filed on Sep. 9, 2003, provisional application No. 60/501,819, filed on Sep. 9, 2003.

(51) Int. Cl.
*C08G 65/04* (2006.01)
*B32B 27/40* (2006.01)

(52) U.S. Cl. .......... 428/412; 428/422.8; 428/423.1

(58) Field of Classification Search .......... 428/423.1, 428/451, 423; 350/354
See application file for complete search history.

(56) References Cited

U.S. PATENT DOCUMENTS

| | | | |
|---|---|---|---|
| 2,443,286 A | 6/1948 | Weston | |
| 2,618,200 A | 11/1952 | Clave et al. | |
| 3,051,054 A | 8/1962 | Crandon | |
| 3,560,076 A | 2/1971 | Ceppi | |
| 3,711,417 A | 1/1973 | Schuler | |
| 3,786,119 A | 1/1974 | Ortlieb | |
| 3,806,462 A | 4/1974 | Bloom | |
| 3,833,289 A | 9/1974 | Schuler | |
| 3,846,013 A | 11/1974 | Cohen | |
| 3,877,798 A | 4/1975 | Tolar et al. | |
| 3,878,282 A | 4/1975 | Bonis et al. | |
| 3,940,304 A | 2/1976 | Schuler | |
| 3,963,679 A | 6/1976 | Ullrich et al. | |
| 3,988,610 A | 10/1976 | Street | |
| 3,989,676 A * | 11/1976 | Gerkin et al. | 528/81 |
| 4,008,031 A | 2/1977 | Weber | |
| 4,012,232 A | 3/1977 | Uhlmann et al. | |
| 4,035,213 A | 7/1977 | Thoma et al. | |
| 4,035,524 A | 7/1977 | Fritsch | |
| 4,035,527 A | 7/1977 | Deeg | |
| 4,046,586 A | 9/1977 | Uhlmann et al. | |
| 4,085,919 A | 4/1978 | Sullivan | |
| 4,091,057 A | 5/1978 | Weber | |
| 4,106,861 A | 8/1978 | Brewer et al. | |
| 4,160,853 A | 7/1979 | Ammons | |
| 4,166,043 A | 8/1979 | Uhlmann et al. | |
| 4,170,567 A | 10/1979 | Chu et al. | |
| 4,211,590 A | 7/1980 | Steward et al. | |
| 4,251,476 A | 2/1981 | Smith | |
| 4,268,134 A | 5/1981 | Gulati et al. | |
| 4,364,878 A | 12/1982 | Laliberte et al. | |
| 4,367,170 A | 1/1983 | Uhlmann et al. | |
| 4,409,169 A | 10/1983 | Bartholdsten et al. | |
| 4,440,672 A | 4/1984 | Chu | |
| 4,442,061 A | 4/1984 | Matsuda et al. | |
| 4,490,495 A | 12/1984 | Weber | |
| 4,495,015 A | 1/1985 | Petcen | |
| 4,519,763 A | 5/1985 | Matsuda et al. | |
| 4,540,534 A | 9/1985 | Grendol | |
| 4,590,144 A * | 5/1986 | Schornick et al. | 430/273.1 |
| 4,628,134 A | 12/1986 | Gould et al. | |
| 4,645,317 A | 2/1987 | Frieder et al. | |
| 4,650,533 A | 3/1987 | Parker et al. | |
| 4,679,918 A | 7/1987 | Ace | |
| 4,699,473 A | 10/1987 | Chu | |
| 4,756,973 A | 7/1988 | Sakagami et al. | |
| 4,767,647 A | 8/1988 | Bree | |
| 4,781,452 A | 11/1988 | Ace | |
| 4,793,703 A | 12/1988 | Fretz, Jr. | |
| 4,828,769 A | 5/1989 | Maus et al. | |
| 4,839,110 A | 6/1989 | Kingsbury | |
| 4,867,553 A | 9/1989 | Frieder | |
| 4,873,029 A | 10/1989 | Blum | |
| 4,882,438 A | 11/1989 | Tanaka et al. | |
| 4,883,548 A | 11/1989 | Onoki | |
| 4,889,412 A | 12/1989 | Clere et al. | |
| 4,889,413 A | 12/1989 | Ormsby et al. | |
| 4,892,403 A | 1/1990 | Merle | |
| 4,892,700 A | 1/1990 | Guerra et al. | |
| 4,898,706 A | 2/1990 | Yabe et al. | |

(Continued)

FOREIGN PATENT DOCUMENTS

AU    2003225785 B2    9/2003

(Continued)

OTHER PUBLICATIONS

United States Patent and Trademark Office, Final Office Action mailed Aug. 10, 2011 in U.S. Appl. No. 12/401,277, 20 pages. United States Patent and Trademark Office, Office Action mailed Jul. 15, 2011 in U.S. Appl. No. 12/959,201, 13 pages.
United States Patent and Trademark Office, Office Action mailed Jul. 1, 2011 in U.S. Appl. No. 11/458,255, 22 pages.
United States Patent and Trademark Office, Notice of Allowance mailed Jun. 8, 2011 in U.S. Appl. No. 11/398,819, 6 pages.
United States Patent and Trademark Office, Notice of Allowance mailed Apr. 1, 2011 in U.S. Appl. No. 11/368,929, 27 pages.
United States Patent and Trademark Office, Office Action mailed Mar. 24, 2011 in U.S. Appl. No. 10/938,275, 14 pages.
United States Patent and Trademark Office, Notice of Allowance mailed Mar. 10, 2011 in U.S. Appl. No. 11/458,255, 7 pages.

(Continued)

*Primary Examiner* — Terressa Boykin
(74) *Attorney, Agent, or Firm* — Inskeep IP Group, Inc.

(57) ABSTRACT

A photochromic polyurethane laminate that is constructed to solve certain manufacturing difficulties involved in the production of plastic photochromic lenses is disclosed. The photochromic laminate includes at least two layers of a resinous material and a photochromic polyurethane layer that is interspersed between the two resinous layers and which contains photochromic compounds. The polyurethane layer is formed by curing a mixture of a solid thermoplastic polyurethane, at least one isocyanate prepolymer, at least one photochromic compound, and a stabilizing system.

20 Claims, No Drawings

U.S. PATENT DOCUMENTS

| | | | |
|---|---|---|---|
| 4,900,242 A | 2/1990 | Maus et al. | |
| 4,917,851 A | 4/1990 | Yamada et al. | |
| 4,927,480 A | 5/1990 | Vaughan | |
| 4,933,119 A | 6/1990 | Weymouth, Jr. | |
| 4,944,584 A | 7/1990 | Maeda et al. | |
| 4,955,706 A | 9/1990 | Schmidthaler et al. | |
| 4,960,678 A | 10/1990 | Tanaka et al. | |
| 4,961,894 A | 10/1990 | Yabe et al. | |
| 4,962,013 A | 10/1990 | Tateoka et al. | |
| 4,968,545 A | 11/1990 | Fellman et al. | |
| 4,969,729 A | 11/1990 | Merle | |
| 4,985,194 A | 1/1991 | Watanabe | |
| 4,992,347 A | 2/1991 | Hawkins et al. | |
| 4,994,208 A | 2/1991 | McBain et al. | |
| 5,015,523 A | 5/1991 | Kawashima et al. | |
| 5,017,698 A | 5/1991 | Machida et al. | |
| 5,049,321 A | 9/1991 | Galic | |
| 5,049,427 A | 9/1991 | Starzewski et al. | |
| 5,051,309 A | 9/1991 | Kawaki et al. | |
| 5,073,423 A | 12/1991 | Johnson et al. | |
| 5,106,998 A | 4/1992 | Tanaka et al. | |
| 5,120,121 A | 6/1992 | Rawlings et al. | |
| 5,130,058 A | 7/1992 | Tanaka et al. | |
| 5,147,585 A | 9/1992 | Blum | |
| 5,149,181 A | 9/1992 | Bedford | |
| 5,175,201 A * | 12/1992 | Forgione et al. | 524/257 |
| 5,188,787 A | 2/1993 | King et al. | |
| 5,214,453 A | 5/1993 | Giovanzana | |
| 5,223,862 A | 6/1993 | Dasher et al. | |
| 5,246,989 A | 9/1993 | Iwamoto et al. | |
| 5,252,450 A | 10/1993 | Schwerzel et al. | |
| 5,266,447 A | 11/1993 | Takahashi et al. | |
| 5,268,231 A | 12/1993 | Knapp-Hayes | |
| 5,286,419 A | 2/1994 | Van Ligten et al. | |
| 5,288,221 A | 2/1994 | Stoerr et al. | |
| 5,292,243 A | 3/1994 | Gibbemeyer | |
| 5,327,180 A | 7/1994 | Hester, III et al. | |
| 5,336,261 A | 8/1994 | Barrett et al. | |
| 5,349,065 A | 9/1994 | Tanaka et al. | |
| 5,391,327 A | 2/1995 | Ligas et al. | |
| 5,405,557 A | 4/1995 | Kingsbury | |
| 5,430,146 A | 7/1995 | Tanaka et al. | |
| 5,433,810 A | 7/1995 | Abrams | |
| 5,434,707 A | 7/1995 | Dalzell et al. | |
| 5,435,963 A | 7/1995 | Backovan et al. | |
| 5,449,558 A | 9/1995 | Hasegawa et al. | |
| 5,523,030 A | 6/1996 | Kingsbury | |
| 5,531,940 A | 7/1996 | Gupta et al. | |
| 5,631,720 A | 5/1997 | Guglielmetti et al. | |
| 5,658,502 A | 8/1997 | Hughes | |
| 5,699,182 A | 12/1997 | Alfekri | |
| 5,702,645 A | 12/1997 | Hughes | |
| 5,702,813 A | 12/1997 | Murata et al. | |
| 5,708,063 A | 1/1998 | Imura et al. | |
| 5,728,758 A | 3/1998 | Smith | |
| 5,751,481 A | 5/1998 | Dalzell et al. | |
| 5,757,459 A | 5/1998 | Bhalakia et al. | |
| 5,770,115 A | 6/1998 | Misura | |
| 5,800,744 A | 9/1998 | Munakata | |
| 5,827,614 A | 10/1998 | Bhalakia et al. | |
| 5,840,926 A | 11/1998 | Hughes | |
| 5,851,328 A | 12/1998 | Kohan | |
| 5,851,585 A | 12/1998 | Gupta et al. | |
| 5,854,710 A | 12/1998 | Rao et al. | |
| 5,856,860 A | 1/1999 | Bhalakia et al. | |
| 5,872,648 A | 2/1999 | Sanchez et al. | |
| 5,951,939 A | 9/1999 | Chernyak et al. | |
| 6,025,026 A | 2/2000 | Smith et al. | |
| 6,068,797 A | 5/2000 | Hunt | |
| 6,074,579 A | 6/2000 | Greshes | |
| 6,083,597 A | 7/2000 | Kondo | |
| 6,096,246 A | 8/2000 | Chan et al. | |
| 6,107,395 A | 8/2000 | Rosthauser et al. | |
| 6,113,812 A | 9/2000 | Hughes | |
| 6,113,813 A | 9/2000 | Goudjil | |
| 6,114,437 A | 9/2000 | Brown et al. | |
| 6,138,286 A | 10/2000 | Robrahn et al. | |
| 6,145,984 A | 11/2000 | Farwig | |
| 6,146,578 A | 11/2000 | Van Ert et al. | |
| 6,150,430 A | 11/2000 | Walters et al. | |
| 6,165,392 A | 12/2000 | Kobuchi et al. | |
| 6,166,129 A | 12/2000 | Rosthauser et al. | |
| 6,177,032 B1 | 1/2001 | Smith et al. | |
| 6,180,033 B1 | 1/2001 | Greshes | |
| 6,187,444 B1 * | 2/2001 | Bowles et al. | 428/423.1 |
| 6,254,712 B1 | 7/2001 | Enlow et al. | |
| 6,256,152 B1 | 7/2001 | Coldrey et al. | |
| 6,296,785 B1 | 10/2001 | Nelson et al. | |
| 6,309,313 B1 | 10/2001 | Peter | |
| 6,319,433 B1 | 11/2001 | Kohan | |
| 6,328,446 B1 | 12/2001 | Bhalakia et al. | |
| 6,333,073 B1 | 12/2001 | Nelson et al. | |
| 6,334,681 B1 | 1/2002 | Perrott et al. | |
| 6,353,078 B1 * | 3/2002 | Murata et al. | 528/83 |
| 6,390,621 B1 | 5/2002 | Maki et al. | |
| 6,416,690 B1 | 7/2002 | Soane et al. | |
| 6,441,077 B1 | 8/2002 | Border et al. | |
| 6,521,146 B1 | 2/2003 | Mead | |
| 6,547,390 B1 | 4/2003 | Bernheim et al. | |
| 6,585,373 B2 | 7/2003 | Evans et al. | |
| 6,608,215 B2 | 8/2003 | Quin | |
| 6,613,433 B2 | 9/2003 | Yamamoto et al. | |
| 6,698,884 B2 | 3/2004 | Perrott et al. | |
| 6,770,324 B2 | 8/2004 | Hooker | |
| 6,797,383 B2 | 9/2004 | Nishizawa et al. | |
| 6,807,006 B2 | 10/2004 | Nakagoshi | |
| 6,814,896 B2 | 11/2004 | Bhalakia et al. | |
| 6,863,844 B2 | 3/2005 | Engardio et al. | |
| 6,863,848 B2 | 3/2005 | Engardio et al. | |
| 6,971,116 B2 | 11/2005 | Takeda et al. | |
| 7,004,583 B2 | 2/2006 | Miniutti et al. | |
| 7,008,568 B2 | 3/2006 | Qin | |
| 7,021,761 B2 | 4/2006 | Künzler et al. | |
| 7,025,457 B2 | 4/2006 | Trinh et al. | |
| 7,025,458 B2 | 4/2006 | Vu | |
| 7,036,932 B2 | 5/2006 | Boulineau et al. | |
| 7,048,997 B2 | 5/2006 | Bhalakia et al. | |
| 7,077,985 B2 | 7/2006 | Maki et al. | |
| 7,104,648 B2 | 9/2006 | Dahi et al. | |
| 7,258,437 B2 | 8/2007 | King et al. | |
| 7,335,702 B2 | 2/2008 | La Dous | |
| 7,350,917 B2 | 4/2008 | Kawai et al. | |
| 7,465,414 B2 | 12/2008 | Knox et al. | |
| 7,500,749 B2 | 3/2009 | Vu | |
| 2001/0035935 A1 | 11/2001 | Bhalakia et al. | |
| 2002/0197484 A1 | 12/2002 | Nishizawa et al. | |
| 2003/0184863 A1 | 10/2003 | Nakagoshi | |
| 2004/0125335 A1 | 7/2004 | Vu | |
| 2004/0207809 A1 | 10/2004 | Blackburn et al. | |
| 2005/0009964 A1 | 1/2005 | Sugimura et al. | |
| 2005/0168689 A1 | 8/2005 | Knox | |
| 2005/0168690 A1 | 8/2005 | Kawai et al. | |
| 2005/0233153 A1 | 10/2005 | Qin et al. | |
| 2006/0065989 A1 | 3/2006 | Druffel et al. | |
| 2006/0146278 A1 | 7/2006 | Vu | |
| 2006/0187411 A1 | 8/2006 | Boulineau et al. | |
| 2006/0192306 A1 | 8/2006 | Giller et al. | |
| 2006/0244909 A1 | 11/2006 | Maki et al. | |
| 2006/0264563 A1 | 11/2006 | Hanrahan et al. | |
| 2007/0001327 A1 | 1/2007 | Chiu | |
| 2007/0122626 A1 | 5/2007 | Qin et al. | |
| 2007/0177100 A1 | 8/2007 | Knox | |
| 2007/0291345 A1 | 12/2007 | Kumar et al. | |

FOREIGN PATENT DOCUMENTS

| | | |
|---|---|---|
| AU | 2004270746 B2 | 3/2005 |
| EP | 0 050 594 A2 | 4/1982 |
| EP | 0 134 633 A2 | 3/1985 |
| EP | 0 299 509 A2 | 1/1989 |
| EP | 0 415 716 A1 | 6/1991 |
| EP | 0 552 498 A1 | 7/1993 |
| EP | 0 814 956 B2 | 1/1998 |
| EP | 1 162 482 A2 | 12/2001 |
| EP | 1 273 935 A1 | 1/2003 |
| GB | 2 174 711 A | 11/1986 |
| JP | 56013139 | 2/1981 |
| JP | 58173181 A | 10/1983 |

| | | | |
|---|---|---|---|
| JP | 60-195515 A | 10/1985 |
| JP | 61-005910 | 1/1986 |
| JP | 61-032004 | 2/1986 |
| JP | 61-236521 A | 10/1986 |
| JP | 61-276882 | 12/1986 |
| JP | 61276882 | 12/1986 |
| JP | 63-061203 | 3/1988 |
| JP | 63-178193 | 7/1988 |
| JP | 631178193 | 7/1988 |
| JP | 64-22538 | 1/1989 |
| JP | 03-132701 | 6/1991 |
| JP | 03 282445 | 12/1991 |
| JP | 32-69507 | 12/1991 |
| JP | 3269507 | 12/1991 |
| JP | 4-358145 | 12/1992 |
| JP | 4358145 | 12/1992 |
| JP | 05 032965 | 2/1993 |
| JP | 62-38689 | 8/1994 |
| JP | 07 048363 | 2/1995 |
| JP | 90-01716 A | 1/1997 |
| JP | 9001716 | 1/1997 |
| JP | 2002196103 | 7/2002 |
| JP | 2002196103 A | 7/2002 |
| JP | 2004 034609 | 2/2004 |
| WO | WO 81/00769 A1 | 3/1981 |
| WO | WO 95/15845 A1 | 6/1995 |
| WO | WO 96/34735 A1 | 11/1996 |
| WO | WO 98/37115 A1 | 8/1998 |
| WO | WO 01/49478 A2 | 7/2001 |
| WO | WO 02/093235 A1 | 11/2002 |
| WO | WO-02093235 | 11/2002 |
| WO | WO 03/078148 A1 | 9/2003 |
| WO | WO 2004/011235 A1 | 2/2004 |
| WO | WO 2004/068217 A2 | 8/2004 |
| WO | WO 2005/023529 A2 | 3/2005 |
| WO | WO 2006/094313 A2 | 9/2006 |
| WO | WO 2007/041347 A2 | 4/2007 |

OTHER PUBLICATIONS

United States Patent and Trademark Office, Office Action mailed Jan. 6, 2011 in U.S. Appl. No. 12/401,277, 13 pages.
IP Australia, Notice of Acceptance mailed Nov. 17, 2010 in Australian Patent Application No. 2004270746, 3 pages.
United States Patent and Trademark Office, Office Action mailed Oct. 6, 2010 in U.S. Appl. No. 11/368,929, 12 pages.
United States Patent and Trademark Office, Office Action mailed Sep. 17, 2010 in U.S. Appl. No. 11/458,255, 9 pages.
United States Patent and Trademark Office, Office Action mailed Sep. 7, 2010 in U.S. Appl. No. 12/401,277, 12 pages.
United States Patent and Trademark Office, Notice of Allowance mailed Aug. 31, 2010 in U.S. Appl. No. 11/537,571, 4 pages.
United States Patent and Trademark Office, Office Action mailed May 28, 2010 in U.S. Appl. No. 11/537,571, 6 pages.
United States Patent and Trademark Office, Office Action mailed May 26, 2010 in U.S. Appl. No. 11/398,819, 6 pages.
European Patent Office, Examination Report mailed Apr. 26, 2010 in European Patent Application No. 03 744 674.7-2307, 5 pages.
United States Patent and Trademark Office, Office Action mailed Mar. 29, 2010 in U.S. Appl. No. 12/401,277, 12 pages.
United States Patent and Trademark Office, Final Office Action mailed Mar. 8, 2010 in U.S. Appl. No. 11/458,255, 7 pages.
United States Patent and Trademark Office, Final Office Action mailed Feb. 23, 2010 in U.S. Appl. No. 10/938,275, 11 pages.
European Patent Office, Examination Report dated Jan. 29, 2010 in European Patent Application No. 04009085.4-2217, 3 pages.
IP Australia, Examiner's Report mailed Oct. 29, 2009 in Australian Patent Application No. 2004270746, 3 pages.
United States Patent and Trademark Office, Final Office Action mailed Oct. 29, 2009 in U.S. Appl. No. 11/368,929, 9 pages.
United States Patent and Trademark Office, Office Action mailed Aug. 24, 2009 in U.S. Appl. No. 11/537,571, 12 pages.
United States Patent and Trademark Office, Office Action mailed Aug. 6, 2009 in U.S. Appl. No. 11/398,819, 5 pages.
United States Patent and Trademark Office, Office Action mailed Jul. 16, 2009 in U.S. Appl. No. 10/938,275, 10 pages.
United States Patent and Trademark Office, Office Action mailed Jun. 22, 2009 in U.S. Appl. No. 11/458,255, 5 pages.
United States Patent and Trademark Office, Office Action mailed Mar. 9, 2009 in U.S. Appl. No. 11/368,929, 16 pages.
European Patent Office, Examination Report mailed Mar. 3, 2009 in European Patent Application No. 03744674.7-2307, 3 pages.
United States Patent and Trademark Office, Final Office Action mailed Jan. 23, 2009 in U.S. Appl. No. 11/458,255, 5 pages.
European Patent Office, Examination Report dated Jan. 22, 2009 in European Patent Application No. 03 772 064.6-1211, 4 pages.
United States Patent and Trademark Office, Final Office Action mailed Dec. 5, 2008 in U.S. Appl. No. 10/938,275, 10 pages.
United States Patent and Trademark Office, Final Office Action mailed Dec. 1, 2008 in U.S. Appl. No. 11/398,819, 6 pages.
United States Patent and Trademark Office, Notice of Allowance mailed Oct. 28, 2008 in U.S. Appl. No. 11/370,731, 7 pages.
United States Patent and Trademark Office, Office Action mailed Jun. 24, 2008 in U.S. Appl. No. 11/458,255, 8 pages.
United States Patent and Trademark Office, Office Action mailed Jun. 20, 2008 in U.S. Appl. No. 10/938,275, 10 pages.
European Patent Office, Examination Report mailed May 14, 2008 in European Patent Application No. 06816842.7-1234, 2 pages.
United States Patent and Trademark Office, Office Action mailed May 1, 2008 in U.S. Appl. No. 11/370,731, 11 pages.
United States Patent and Trademark Office, Office Action mailed Apr. 8, 2008 in U.S. Appl. No. 11/398,819, 6 pages.
United States Patent and Trademark Office, Final Office Action mailed Feb. 8, 2008 in U.S. Appl. No. 10/764,762, 10 pages.
United States Patent and Trademark Office, Notice of Allowance mailed Jan. 25, 2008 in U.S. Appl. No. 11/398,814, 7 pages.
United States Patent and Trademark Office, Office Action mailed Oct. 18, 2007 in U.S. Appl. No. 11/370,731, 11 pages.
United States Patent and Trademark Office, Final Office Action mailed Oct. 9, 2007 in U.S. Appl. No. 10/938,275, 9 pages.
IP Australia, Examiner's Report mailed Sep. 12, 2007 in Australian Patent Application No. 2003225785, 2 pages.
WIPO, U.S. International Searching Authority, International Search Report and Written Opinion mailed Aug. 27, 2007 in International Patent Application No. PCT/US06/08444, 7 pages.
United States Patent and Trademark Office, Office Action mailed Jul. 10, 2007 in U.S. Appl. No. 11/398,814, 10 pages.
United States Patent and Trademark Office, Office Action mailed Jul. 3, 2007 in U.S. Appl. No. 10/630,277, 6 pages.
United States Patent and Trademark Office, Office Action mailed May 17, 2007 in U.S. Appl. No. 10/764,762, 13 pages.
Folatjar, D.A. and Horn, K., "Polycarbonates," in *Techniques de l'Ingénieur, traité Plastiques et Composites* vol. AM3 (Trmenstrial), Blanc, André, ed., Apr. 14, 2007, 15 pp.
WIPO, U.S. International Searching Authority, International Search Report and Written Opinion mailed Mar. 6, 2007 in International Patent Application No. PCT/US06/38142, 4 pages.
United States Patent and Trademark Office, Office Action mailed Jan. 8, 2007 in U.S. Appl. No. 10/938,275, 10 pages.
United States Patent and Trademark Office, Notice of Intent to Issue Ex Parte Reexamination Certificate mailed Dec. 28, 2006 in U.S. Appl. No. 90/007,325, 12 pages.
United States Patent and Trademark Office, Final Office Action mailed Dec. 19, 2006 in U.S. Appl. No. 11/398,814, 9 pages.
European Patent Office, Examination Report dated Nov. 13, 2006 in European Patent Application No. 04 009 085.4-2217, 2 pages.
United States Patent and Trademark Office, Final Office Action mailed Nov. 8, 2006 in U.S. Appl. No. 10/630,277, 5 pages.
United States Patent and Trademark Office, Final Office Action mailed Nov. 2, 2006 in U.S. Appl. No. 10/764,762, 9 pages.
United States Patent and Trademark Office, Office Action mailed Aug. 25, 2006 in U.S. Appl. No. 90/007,325, 19 pages.
United States Patent and Trademark Office, Office Action mailed Jul. 5, 2006 in U.S. Appl. No. 11/398,814, 8 pages.
United States Patent and Trademark Office, Office Action mailed Mar. 21, 2006 in U.S. Appl. No. 10/764,762, 11 pages.
United States Patent and Trademark Office, Notice of Allowance mailed Mar. 15, 2006 in U.S. Appl. No. 10/389,353, 8 pages.

United States Patent and Trademark Office, Office Action mailed Feb. 24, 2006 in U.S. Appl. No. 10/630,277, 8 pages.
European Patent Office, Examination Report dated Feb. 15, 2006 in European Patent Application No. 04 009 085.4-17, 3 pages.
United States Patent and Trademark Office, Notice of Allowance mailed Nov. 16, 2005 in U.S. Appl. No. 09/848,594, 6 pages.
United States Patent and Trademark Office, Notice of Allowance mailed Nov. 10, 2005 in U.S. Appl. No. 10/636,383, 7 pages.
WIPO, U.S. International Preliminary Examining Authority, International Preliminary Report on Patentability mailed Sep. 20, 2005 in International Patent Application No. PCT/US04/30023, 4 pages.
European Patent Office, Examination Report dated Sep. 2, 2005 in European Patent Application No. 03 772 064.6-1253, 5 pages.
United States Patent and Trademark Office, Office Action mailed Jul. 27, 2005 in U.S. Appl. No. 10/389,353, 8 pages.
United States Patent and Trademark Office, Final Office Action mailed Jun. 21, 2005 in U.S. Appl. No. 09/848,594, 7 pages.
WIPO, U.S. International Preliminary Examining Authority, International Preliminary Report on Patentability mailed May 20, 2005 in International Patent Application No. PCT/US2004/001939, 4 pages.
United States Patent and Trademark Office, Final Office Action mailed May 11, 2005 in U.S. Appl. No. 10/636,383, 10 pages.
WIPO, U.S. International Searching Authority, International Search Report and Written Opinion mailed Apr. 4, 2005 in International Patent Application No. PCT/US04/30023, 8 pages.
WIPO, U.S. International Preliminary Examining Authority, International Preliminary Report on Patentability mailed Mar. 18, 2005 in International Patent Application No. PCT/US2003/023744, 4 pages.
United States Patent and Trademark Office, Office Action mailed Jan. 25, 2005 in U.S. Appl. No. 10/389,353, 10 pages.
WIPO, U.S. International Search Authority, International Search Report and Written Opinion mailed Dec. 16, 2004 in International Patent Application No. PCT/US2004/001939, 9 pages.
United States Patent and Trademark Office, Office Action mailed Dec. 8, 2004 in U.S. Appl. No. 09/848,594, 8 pages.
European Patent Office, Supplementary European Search Report dated Nov. 11, 2004 in European Patent Application No. EP 04 00 9085, 2 pages.
United States Patent and Trademark Office, Office Action mailed Sep. 21, 2004 in U.S. Appl. No. 10/636,383, 9 pages.
United States Patent and Trademark Office, Office Action mailed Jul. 27, 2004 in U.S. Appl. No. 10/183,088, 3 pages.
WIPO, U.S. International Preliminary Examining Authority, Written Opinion mailed Jun. 9, 2004 in International Patent Application No. PCT/US2003/023744, 4 pages.
European Patent Office, Decision to Grant dated Mar. 11, 2004 in European Patent Application No. 96908587.7-2217 0814956, 1 pages.
United States Patent and Trademark Office, Office Action mailed Feb. 20, 2004 in U.S. Appl. No. 09/848,594, 9 pages.
United States Patent and Trademark Office, Notice of Allowance mailed Dec. 17, 2003 in U.S. Appl. No. 10/183,088, 5 pages.
WIPO, U.S. International Search Authority, International Search Report mailed Dec. 15, 2003 in International Patent Application No. PCT/US2003/023744, 6 pages.
United States Patent and Trademark Office, Office Action mailed Jun. 2, 2003 in U.S. Appl. No. 09/848,594, 12 pages.
United States Patent and Trademark Office, Office Action mailed Apr. 9, 2003 in U.S. Appl. No. 10/183,088, 8 pages.
United States Patent and Trademark Office, Final Office Action mailed Mar. 5, 2003 in U.S. Appl. No. 09/854,419, 11 pages.
European Patent Office, Examination Report dated Jan. 9, 2003 in European Patent Application No. 96 908 587.7-2217, 3 pages.
United States Patent and Trademark Office, Office Action mailed Sep. 4, 2002 in U.S. Appl. No. 09/854,419, 12 pages.
European Patent Office, Examination Report dated May 7, 2002 in European Patent Application No. 96 908 587.7-2217, 3 pages.
European Patent Office, Examination Report dated Jun. 29, 2001 in European Patent Application No. 96 908 587.7-2217, 4 pages.
United States Patent and Trademark Office, Notice of Allowance mailed Jan. 8, 2001 in U.S. Appl. No. 09/425,517, 7 pages.
European Patent Office, Examination Report dated Dec. 27, 2000 in European Patent Application No. 96 908 587.7-2217, 7 pages.
United States Patent and Trademark Office, Office Action mailed Sep. 22, 2000 in U.S. Appl. No. 09/425,517, 11 pages.
European Patent Office, Supplementary European Search Report dated Nov. 11, 1998 in European Patent Application No. EP 96 90 8587, 3 pages.
WIPO, U.S. International Search Authority, International Search Report mailed Aug. 14, 1996 in International Patent Application No. PCT/US96/02777, 1 pages.
ORCOLITE, Press release: "ORCOLITE® Releases the Industry's first Prescription Polarized Polycarbonate lens—PolarPoly™," Oct. 2, 1995, Azusa, California, 2 pages.
Mitsubishi Engineering Plastics Corp., Material Safety Data sheet, Jun. 1, 1995, 4 pages.
Narisawa, H. et al., "Photocontrol of orientation of photochromic dichroic dyes in cholesteric polymer films," *Macromol. Chem.. Phys.* 196, May 1995, pp. 1419-1430.
Sisido, M. et al., "Induced Circular Dichroism from Cholesteric Polypeptide Films Doped with an Azobenzene Derivative," *Macromolecules*, 1993, 26 pp. 1424-2428.
Frames Product Guide, "Lenses," Jan. 1993, 2 pages.
Krongauz, V.A. "Chapter 21: Environmental Effects on Organic Photochromic Systems," in *Studies in Organic Chemistry* 40, Dürr, H., Bouas-Laurent, H., Eds.; Elsevier: Amsterdam, 1990, pp. 793-821.
MGC, "Coated Film Insert Injection Process," Oct. 1988, pp. 122-128, Rev. 1993.8, Lot No. 93 08 2000 DPR.
Asakura Shoten Co., Ltd, publisher, "10.5.3 Types of eyeglass lenses," Extract from "Kougaku Gijutsu Handbook", supplementary edition. Fifth Edition published Aug. 10, 1980, 4 pages.
McGraw-Hill Book Company, "Eye glasses," in *McGraw-Hill Encyclopedia of Science and Technology*, 1960, pp. 172-173.
Japanese Publication, undated.
KB Co. Publication, undated.

* cited by examiner

PHOTOCHROMIC POLYURETHANE LAMINATE

CROSS REFERENCE TO RELATED APPLICATIONS

This application claims the benefit of priority from U.S. Provisional Application Ser. No. 60/501,820 filed on Sep. 9, 2003 entitled Photochromic Laminate; and U.S. Provisional Application Ser. No. 60/501,819 filed on Sep. 9, 2003 entitled Photochromic Film And Method Of Manufacture which are hereby incorporated herein by reference.

BACKGROUND OF THE INVENTION

1. Field of the Invention

The present invention relates generally to a photochromic laminate that can be applied to polymeric surfaces or can be used by itself as a photochromic element. The invention also relates to a photochromic laminate that is capable of withstanding high temperatures and can be incorporated into plastic lenses by means of injection molding. The invention further relates to a photochromic laminate that is excellent in both control of thickness and surface smoothness of the photochromic layer, and thereof exhibits uniform darkness at the activated state.

2. Description of the Related Art

Photochromic articles, particularly photochromic plastic materials for optical applications, have been the subject of considerable attention. In particular, photochromic ophthalmic plastic lenses have been investigated because of the weight advantage and impact resistance they offer over glass lenses. Moreover, photochromic transparencies, e.g. window sheets, for vehicles such as cars, boats and airplanes, have been of interest because of the potential safety features that such transparencies offer.

The use of polycarbonate lenses, particularly in the United States, is widespread. The demand for sunglasses that are impact resistant has increased as a result of extensive outdoor activity. Materials such as polycarbonate have not historically been considered optimal hosts for photochromic dyes due to slow activation rate, slow fading (bleeching) rate, and low activation intensity.

Nonetheless, there are several existing methods to incorporate photochromic properties into lenses made from materials such as polycarbonate. One method involves applying to the surface of a lens a coating containing dissolved photochromic compounds. For example, Japanese Patent Application 3-269507 discloses applying a thermoset polyurethane coating containing photochromic compounds on the surface of a lens. U.S. Pat. No. 6,150,430 also discloses a photochromic polyurethane coating for lenses.

Another method involves coating a lens with a base coating. An imbibing process described in U.K. Pat. No. 2,174,711 or U.S. Pat. No. 4,968,454 is used to imbibe a solution containing photochromic compounds into the base coating material. The most commonly used base material is polyurethane.

However, the two methods described above, which involve coating the lens after it is molded, have significant shortcomings. For example, typically a coating of about 25 µm or more is needed to incorporate a sufficient quantity of photochromic compounds into the base in order to provide the desired light blocking quality when the compounds are activated. This relatively thick coating is not suited for application on the surface of a segmented, multi-focal lens because an unacceptable segment line and coating thickness nonuniformity around the segment line are produced, and the desirable smooth surface quality is affected.

Lenses made from plastic materials such as polycarbonate are produced by an injection molding process and insert (also known as in-mold decoration) injection molding is used to incorporate photochromic properties into the lenses. Insert injection molding is a process whereby a composition is injection molded onto an insert in the mold cavity. For example, as disclosed in commonly assigned U.S. Pat. No. 6,328,446, a photochromic laminate is first placed inside a mold cavity. Polycarbonate lens material is next injected into the cavity and fused to the back of the photochromic laminate, producing a photochromic polycarbonate lens. Because the photochromic function is provided by a thin photochromic layer in the laminate, it is practical to make photochromic polycarbonate lenses with any kind of surface curvature by the insert injection molding method.

Transparent resin laminates with photochromic properties have been disclosed in many patents and publications, for example, Japanese Patent Applications 61-276882, 63-178193, 4-358145, and 9-001716; U.S. Pat. No. 4,889,413; U.S. Patent Publication No. 2002-0197484; and WO 02/093235. The most commonly used structure is a photochromic polyurethane host layer bonded between two transparent resin sheets. Although the use of polyurethane as a photochromic host material is well known, photochromic polyurethane laminates designed especially for making photochromic polycarbonate lenses through the insert injection molding method are unique.

Problems associated with conventional insert injection molding techniques in the manufacture of photochromic lens are polyurethane bleeding and poor replication of segment lines. "Bleeding" occurs from the deformation of the polyurethane layer during processing. In particular, bleeding occurs when the polyurethane layer melts and escapes from its position between the two transparent sheets of the laminate during the injection molding process. The inventors have discovered that bleeding most frequently results from an excess amount of polyurethane and from using too soft a material. The inventors have also discovered that poor replication of segment lines occurs when the layer of polyurethane is too thick and movement of the laminate occurs as pressure from the mold is applied.

In order to prevent the bleeding problem, it is preferred to have the polyurethane cross-linked. However, cross-linked polyurethane, once made, is difficult to be laminated between transparent resin sheets. A convenient method to incorporate cross-linked polyurethane is to start with a liquid polyurethane system such as the one described in U.S. Patent Publication No. 2002-0197484. To make the laminate efficiently, a web coat-laminate line such as the one described in Japan Patent Laid Open 2002-196103, is usually used. The state of the art coating equipment is capable of coating a uniform layer of liquid polyurethane mixture. However, this layer will only be partially solidified (or cured) at the moment of in-line lamination. Any possible surface defects of resin sheet and lamination rollers are easily transferred to the soft polyurethane layer during lamination. The most often seen defects in the polyurethane layer include thickness un-evenness across the web and thin spots due to uneven pressure at lamination or improper handling. In order to have the polyurethane layer firm enough to withstand the necessary pressure during lamination, it needs to be cured for a certain amount of time, which slows down the processing or renders the continues web coating-laminating impossible.

Therefore, the need exists to overcome the problems and shortcomings associated with existing polyurethane laminates having photochromic properties and methods of making these laminates.

BRIEF SUMMARY OF THE INVENTION

The need and shortcomings of the existing laminates and methods of manufacturing these laminates are met by the polyurethane laminate and method in accordance with the present invention.

It is an object of the present invention to provide a transparent photochromic polyurethane laminate that has improved thickness uniformity and surface smoothness, so that the darkness or light transmission at the activated state is uniform.

It is another object of the present invention to provide a photochromic polyurethane laminate that exhibits dimensional stability under high temperature and high pressure, so that it can be used to produce a plastic photochromic lens though an insert injection molding process.

The objects are achieved by the transparent photochromic polyurethane laminate in accordance with the present invention. One embodiment of the present invention comprises a polyurethane layer including photochromic compounds having first and second sides, a front transparent resin sheet is bonded to the first side of the polyurethane photochromic layer, and a back transparent resin sheet is bonded to the second side of the polyurethane photochromic layer. The front and back transparent resin sheets may be bonded to the polyurethane layer with or without additional adhesive such as epoxies and the acrylate types. The front and back transparent resin sheets are preferably made of the same material as the lens base. That is, if the lens base material is polycarbonate, it is preferred to have polycarbonate resin sheets bonded to the polyurethane photochromic layer. If the lens base material is cellulose acetate butyrate, then it is preferred to have cellulose acetate butyrate resin sheets bonded to the polyurethane photochromic layer. Any clear, transparent plastic resin may be used for the base and resin sheets, for example, polysulfones, polyacrylates and polycycloolefins. The term "front resin sheet" means that the resin sheet is facing the mold cavity to duplicate the front (convex) surface of the whole lens. By the term "back", we mean that the resin sheet is facing the lens base. The term "lens base" means the portion of the lens that is molded onto the laminate to form the main portion of the lens.

The objects of the present invention are further achieved by the careful design of the polyurethane composition used to host the photochromic dyes. The polyurethane layer material comprises a) a solid thermoplastic polyurethane, b) at least one aliphatic isocyanate-terminated polyurethane prepolymer, and c) at least one photochromic compound selected from a group consisting of spiropyrans, spiroxizines, fulgides, fulgimides, and naphthopyrans. The thermoplastic polyurethane has a theoretical NCO index from 90 to 105, and a molecular weight (number averaged) of from 9,000 to 100,000. The isocyanate prepolymer has a NCO content of from 1.0% to 10.0%, by weight. The weight ratio of the thermoplastic polyurethane vs. the isocyanate prepolymer is in the range from 1:9 to 9:1. The photochromic compound(s) counts for 0.1% to 5% of the total polyurethane, by weight.

To enhance the fatigue resistance of the photochromic compounds, stabilizers such as antioxidants, light stabilizers, and UV absorbers are added in the polyurethane layer.

The photochromic laminate is preferably made through a cast-lamination process. All components described above are dissolved in a suitable solvent, cast on a release liner. After the solvent is evaporated substantially, the thermoplastic polyurethane portion will provide the cast polyurethane film enough rigidity to go through the lamination process without any deformation. After lamination, the polyurethane prepolymer will provide further curability by reacting with active hydrogen atoms in the system to enhance the dimensional stability of the polyurethane layer under high temperature and high pressure.

Although the photochromic laminate according to this invention is especially suitable for making photochromic polycarbonate lenses through the insert injection molding process, other non-limiting uses include photochromic transparencies such as goggles and face shields.

DETAILED DESCRIPTION OF THE INVENTION

The present invention provides a photochromic polyurethane laminate having two transparent resin sheets bonded to a photochromic polyurethane layer formed by curing a mixture of a solid thermoplastic polyurethane, at least one isocyanate prepolymer, at least one photochromic compound, and a stabilizing system. The thermoplastic polyurethane has a theoretical NCO index of from 90 to 105, and a molecular weight (number averaged) of from 20,000 to 100,000. The isocyanate prepolymer has a NCO content of from 1.0% to 10.0%, by weight. The weight ratio of the thermoplastic polyurethane vs. the isocyanate prepolymer in the photochromic polyurethane composition is in the range from 1:9 to 9:1. The photochromic compound(s) counts for 0.1% to 5% of the total polyurethane, by weight.

To enhance the fatigue resistance of the photochromic compounds, stabilizers such as antioxidants, light stabilizers, and UV absorbers are added in the polyurethane layer.

The photochromic laminate is preferably made through a cast-lamination process. All components described above are dissolved in a suitable solvent, cast on a release liner. After the solvent is evaporated substantially, the thermoplastic polyurethane portion will provide the cast polyurethane film enough rigidity to go through the lamination process without any deformation. After lamination, the polyurethane prepolymer will provide further curability by reacting with active hydrogen atoms such as those of terminal hydroxyl groups, moisture, urethane groups, and urea groups in the system to enhance the dimensional stability of the polyurethane layer under high temperature and high pressure.

Transparent Resin Sheets

The material used to make the transparent resin sheet is not limited so long as it is a resin with high transparency. In case the photochromic polyurethane laminate of the present invention is incorporated into a thermoplastic article such as a spectacle lens, the transparent resin sheets of the laminate is preferably of a resin material that is thermally fusible to the article base material so that the photochromic laminate is tightly integrated with the article base when produced with the insert injection molding process. Thus, it is more preferred to have same kind of material for both the article base and the transparent resin sheets.

Suitable sheet resin materials include polycarbonate, polysulfone, cellulose acetate butyrate (CAB), polyacrylates, polyesters, polystyrene, copolymer of an acrylate and styrene, blends of compatible transparent polymers. Preferred resins are polycarbonate, CAB, polyacrylates, and copolymers of acrylate and styrene. A polycarbonate-based resin is particularly preferred because of high transparency, high tenacity, high thermal resistance, high refractive index, and most importantly, and especially its compatibility with the article base material when polycarbonate photochromic lenses are manufactured with the photochromic polyurethane laminate of the present invention and the insert injection molding process. A typical polycarbonate based resin is polybisphenol-A carbonate. In addition, examples of the polycarbonate based resin include homopolycarbonate such as 1,1'-dihydroxydiphenyl-phenylmethylmethane, 1,1'-dihydroxydiphenyl-diphenylmethane, 1,1'-dihydroxy-3,3'-dimethyldiphe-nyl-2,2-propane, their mutual copolymer polycarbonate and copolymer polycarbonate with bisphenol-A.

While the thickness of a transparent resin sheet is not particularly restricted, it is typically 2 mm or less, and preferably 1 mm or less but not less than 0.025 mm.

Thermoplastic Polyurethane

As the thermoplastic polyurethane, it is preferably made from a diisocyanate, a polyol, and a chain extender. Thermoplastic polyurethanes of this kind are known and may be obtained, for example, in accordance with U.S. Pat. Nos. 3,963,679 and 4,035,213, the disclosures of which are incorporated herein by reference.

The thermoplastic polyurethane used in the present invention is particularly prepared from a composition comprising a) an aliphatic isocyanate having a functionality of 2, b) at least one high molecular weight polyol having a nominal functionality of 2 and a molecular weight of from 500 to 6000 g/mole, preferably from 700 to 3000 g/mol, and counting for from about 50% to about 98% by weight, preferably from 70% to 95%, of the total isocyanate reactive species in the composition, and c) at least one low molecular weight diol having a molecular weight of from 62 to 499, and counting for from about 2% to about 50% by weight, preferably from 5% to 30%, of the total isocyanate reactive species in the composition.

Polyols

The polyols of the present invention are those conventionally employed in the art for the preparation of polyurethane cast elastomers. Naturally, and often times advantageously, mixtures of such polyols are also possible. Examples of the suitable polyols include polyether polyols, polyester polyols, polyurethane polyols, polybutadiene polyol, and polycarbonate polyols, while polyether and polyester types are preferred.

Included among suitable polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-tetramethylene and polyoxyethylene glycols, and copolymer glycols prepared from blends or sequential addition of two or more alkylene oxides. The polyalkylene polyether polyols may be prepared by any known process such as, for example, the process disclosed in Encyclopedia of Chemical Technology, Vol. 7, pp. 257-262, published by Interscience Publishers, Inc. (1951), the disclosure of which is incorporated herein by reference.

Polyethers which are preferred include the alkylene oxide addition products of polyhydric alcohols such as ethylene glycol, propylene glycol, dipropylene glycol, trimethylene glycol, 1,2-butanediol, 1,5-pentanediol, 1,6-hexanediol, 1,7-heptanediol, hydroquinone, resorcinol glycerol, glycerine, 1,1,1-trimethylol-propane, 1,1,1-trimethylolethane, pentaerythritol, 1,2,6-hexanetriol, .alpha.-methyl glucoside, sucrose, and sorbitol. Also included within the term "polyhydric alcohol" are compounds derived from phenol such as 2,2-bis(4-hydroxyphenyl)-propane, commonly known as Bisphenol A.

The suitable polyester polyols include the ones which are prepared by polymerizing ϵ-caprolactone using an initiator such as ethylene glycol, ethanolamine and the like. Further suitable examples are those prepared by esterification of polycarboxylic acids. Further suitable polyester polyols include reaction products of polyhydric, preferably dihydric alcohols to which trihydric alcohols may be added and polybasic, preferably dibasic carboxylic acids. Instead of these polycarboxylic acids, the corresponding carboxylic acid anhydrides or polycarboxylic acid esters of lower alcohols or mixtures thereof may be used for preparing the polyesters. The polycarboxylic acids may be aliphatic, cycloaliphatic, aromatic and/or heterocyclic and they may be substituted, e.g., by halogen atoms, and/or unsaturated. The following are mentioned as examples: succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride, endomethylene tetrahydrophthalic acid anhydride; glutaric acid anhydride; maleic acid; maleic acid anhydride; fumaric acid; dimeric and trimeric fatty acids such as oleic acid, which may be mixed with monomeric fatty acids; dimethyl terephthalates and bis-glycol terephthalate. Suitable polyhydric alcohols include, e.g., ethylene glycol; propylene glycol-(1,2) and -(1,3); butylene glycol-(1,4) and -(1,3); hexanediol-(1,6); octanediol-(1,8); neopentyl glycol; (1,4-bis-hydroxymethylcyclohexane); 2-methyl-1,3-propanediol; 2,2,4-trimethyl-1,3-pentanediol; triethylene glycol; tetraethylene glycol; polyethylene glycol; dipropylene glycol; polypropylene glycol; dibutylene glycol and polybutylene glycol, glycerine and trimethlyolpropane. A preferred polyester polyol is polycaprolactone polyol having an average molecular weight from 500 to 6,000, and preferably from 700 to 3,000.

Diols

Suitable diols are those polyols listed above having a functionality of 2 and a molecular weight of from 62 to 499. Preferred diols are 1,4-butane-diol and 1,3-propane-diol.

Isocyanates

The diisocyanate component is preferably an aliphatic diisocyanate. The aliphatic diisocyanate is selected from the group consisting of 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis-(4-isocyanatocyclohexyl)-methane, 2,4'-dicyclohexylmethane diisocyanate, 1,3- and 1,4-bis-(isocyanatomethyl)-cyclohexane, bis-(4-isocyanato-3-methylcyclohexyl)-methane, .alpha.,.alpha.,.alpha.',.alpha.'-tetramethyl-1,3- and/or -1,4-xylylene diisocyanate, 1-isocyanato-1-methyl-4(3)-isocyanatomethyl cyclohexane, 2,4- and/or 2,6-hexahydrotoluylene diisocyanate, and mixtures thereof. Bis-(4-isocyanatocyclohexl)-methane is the preferred diisocyanate in occurrence with the method of the present invention.

The polymerization process to make the thermoplastic polyurethane can be carried out in one-pot fashion, that is, all starting materials are initially added into the reaction vessel. The polymerization process can also be carried out with a prepolymer approach. That is, a polyurethane prepolymer terminated with isocyanate groups is first obtained by reacting a stoichiometrically in excess diisocyanate with a polyol. Suitable equivalent ratio of diisocyanate to polyol in the present invention is from 1.2:1.0 to 8.0:1.0. A chain extender of diol is then mixed with the prepolymer to complete the reaction. The NCO index of the thermoplastic polyurethane, formed from the quotient, which is multiplied by 100, of the equivalent ratio of isocyanate groups to the sum of the hydroxyl groups of polyol and chain extender is within a range of 90 to 105, preferably between 92 and 101.

Catalysts such as organotin or other metallic soaps may be added in the mixture to make a thermoplastic polyurethane. Example catalysts include dibutyltin dilaurate, stannous octoate, and cobalt naphthenate.

Isocyanate Prepolymer

The isocyanate prepolymer used in the photochromic polyurethane composition of the present invention is prepared in the same way as the prepolymer used to prepare the thermoplastic polyurethane in a prepolymer method described above. Preferably, the polyol and the isocyanate used to make the isocyanate prepolymer is the same as the polyol to make the thermoplastic polyurethane. More preferably, the isocyanate is an aliphatic diisocyanate described in the previous sections, and the polyol is a polyester polyol having a molecular weight between 700 and 3,000. The molecular weight (number averaged) of the isocyanate prepolymer is preferably between 1,000 and 6,000, and more preferably between 1,500 and 4,000. As an isocyanate group terminated prepolymer, its NCO content is between 1.0% and 10.0%, preferably between 2.0% and 8.0%.

When mixing the isocyanate prepolymer and the thermoplastic polyurethane together, the mixing ratio by weight is in the range from 1:9 to 9:1, preferably from 1:3 to 3:1.

Photochromic Compounds

Suitable photochromic compounds in the context of the invention are organic compounds that, in solution state, are activated (darken) when exposed to a certain light energy (e.g., outdoor sunlight), and bleach to clear when the light energy is removed. They are selected from the group consisting essentially of benzopyrans, naphthopyrans, spirobenzopyrans, spironaphthopyrans, spirobenzoxzines, spironaphthoxazines, fulgides and fulgimides. Such photochromic compounds have been reported which, for example, in U.S. Pat. Nos. 5,658,502, 5,702,645, 5,840,926, 6,096,246, 6,113,812, and 6,296,785; and U.S. patent application Ser. No. 10/038,350, all commonly assigned to the same assignee as the present invention and all incorporated herein by reference.

Among the photochromic compounds identified, naphthopyran derivatives are preferred for optical articles such as eyewear lenses. They exhibit good quantum efficiency for coloring, a good sensitivity and saturated optical density, an acceptable bleach or fade rate, and most importantly good fatigue behavior. These compounds are available to cover the visible light spectrum from 400 nm to 700 nm. Thus, it is possible to obtain a desired blended color, such as neutral gray or brown, by mixing two or more photochromic compounds having complementary colors under an activated state.

More preferred are naphtho[2,1b]pyrans and naphtho[1,2b]pyrans represented by the following generic formula:

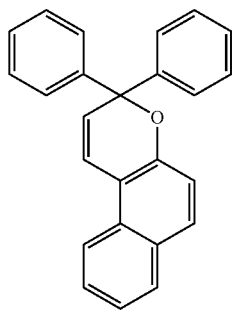

naphth[2, 1-b]pyran

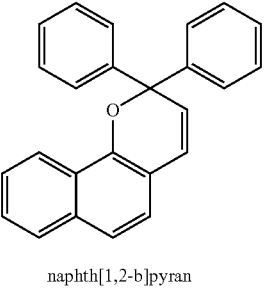

naphth[1,2-b]pyran

Substituents on various positions of the aromatic structure are used to tune the compounds to have desired color and fading rate, and improved fatigue behavior. For example, a photochromic dye may contain a polymerizable group such as a (meth)acryloyloxy group or a (meth)allyl group, so that it can be chemically bonded to the host material through polymerization.

The quantity of photochromic compound(s) incorporated into the polyurethane layer of the present invention is determined by the desired light blockage in the activated state and the thickness of the polyurethane layer itself. The preferred outdoor visible light transmission of sunglasses is preferably between 5% and 50%, more preferably between 8% and 30%, most preferably between 10% and 20%. Preferably, the amount of total photochromic substance incorporated into or applied on the polyurethane layer may range from about 0.1 wt. % to about 5 wt. % of the total polyurethane, and more preferably from about 0.5 wt. % to about 3.0 wt. %. If the thickness of the polyurethane layer is 100 μm, between about 0.5 wt. % to about 1 wt. % of photochromic compound(s) is needed to achieve an outdoor light transmission of between 10% and 20%. The amount of photochromic compound(s) needed is inversely proportional to the thickness of the polyurethane layer. In other words, to achieve the same outdoor light transmission the thicker the polyurethane layer, the lower the concentration of photochromic compound(s) needed. The concentration of the photochromic compound(s) also depends on the color intensity of the photochromic compound(s) at the activated state.

Stabilizers

Additives such as antioxidants and light stabilizers are incorporated into the polyurethane layer in order to improve the fatigue resistance of the photochromic compounds. Hindered amines are usually used as light stabilizers, and hindered phenols are usually used as antioxidants. Preferred hindered amine light stabilizers include, bis(1,2,2,6,6-pentamethyl-4-piperidinyl)-sebacate, or a condensation product of 1,2,2,6,6-pentamethyl-4-piperidinol, tridodecyl alcohol and 1,2,3,4-butanetetra caboxylic acid as tertiary hindered amine compounds. Preferred phenol antioxidants include, 1,1,3-tris(2-methyl-4-hydorxy-5-t-butylphenyl)butane, tetrakis-[methylene-3-(3',5'-di-t-butyl-4'-hydroxy-phenyl)propionate]methane, and 1,3,5-tris(3,5-di-t-butyl-4-hyroxybenzyl)-1,-3,5-triazine-2,4,6-(1H,3H,5H)-trione. Phenol antioxidants that contain 3 or more hindered phenols are preferable.

Process to Make the Laminate

A photochromic laminate having a polyurethane layer in between two transparent resin sheets in accordance with the present invention may be produced through a variety of processes. Depending on the nature of the starting material to the polyurethane, processes such as casting-lamination (also referred to in the art as coating-lamination), and extrusion-lamination may be used.

To the photochromic polyurethane composition of the present invention, a novel casting-lamination process has been developed by the inventors. The process essentially comprises: a) preparing a solvent casting solution by dissolving a solid thermoplastic polyurethane, at least one isocyanate polyurethane prepolymer, at least one photochromic compound, and optional stabilizers in a proper solvent; b) cast the solution on a release liner film; c) remove the solvent from the cast film to a substantially dry state to form a photochromic polyurethane film; d) transfer-laminate the photochromic polyurethane film between two transparent resin sheets; e) cure the photochromic polyurethane film, thereby forming a photochromic polyurethane laminate.

To cast a photochromic polyurethane film, a thermoplastic polyurethane, an isocyanate prepolymer, selected photochromic compounds and other necessary additives are first dissolved in a suitable solvent or in a mix of solvents to form a cast solution. The solid concentration in such a solution is usually 15% to 50%, by weight, and the solution has a viscosity suitable for coating. For example, suitable viscosity of the cast solution for using a slot die method is within the range from 500 cPs to 5000 cPs. Examples of suitable solvents that may be used to dissolve polyurethanes include cyclohexane, toluene, xylene and ethyl benzene, esters such as ethyl acetate, methyl acetate, isopropyl acetate, n-propyl acetate, isobutyl acetate, n-butyl acetate, isoamyl acetate, methyl propionate and isobutyl propionate, ketones such as acetone, methylethyl ketone, diethyl ketone, methylisobutyl ketone, acetyl acetone and cyclohexyl ketone, ether esters such as cellosolve aetate, diethylglycol diaetate, ethyleneglycol mono n-butylether acetate, propylene glycol and monomethylether acetate, tertiary alcohols such as diacetone alcohol and t-amyl alcohol and tetrahydrofuran. Ethyl acetate, methyl ethyl ketone, cyclohexane, tetrahydrofuran, toluene and combinations thereof are preferable.

The solution is then cast on a release liner by using a method known to those skilled in the art, such as slot-die, knife-over-roll, reverse-roll, gravure, etc. Slot die and knife-over-film are preferred. Slot die method is especially preferred due to its capability to handle wide range of solution viscosity and to cast uniform films. A release liner may consist of a base film and a release coating or simply a film itself. Films with surface energy low enough to provide easy release of the cast film can be used by itself. Examples include low energy polyolefins and fluoropolymers. Most commercially available release liners are based on polyester film coated with a release coating. The release coating has a proper surface energy so that a cast solution or coating forms a uniform film (e.g., without beading) on it. At the same time the release coating does not provide good adhesion to the dried film so that the film can be easily peeled off. Release coatings include silicone (siloxane) based and non-silicone base such as fluoropolymers. A liner based on polyester (PET) with cured siloxane release coating is preferred due to the dimensional stability, flatness, handling, solvent resistance, low cost. Suitable liners should have a thickness of from 25 micrometers to 130 micrometers.

The wet photochromic polyurethane film cast on the release liner is sequentially dried in a forced air oven system. The solvent will be substantially evaporated so that the solvent retention in the photochromic polyurethane film is low enough to not cause any defects (e.g., bubbling) in the future laminate. The solvent retention preferably is less than 2 wt. %, more preferably less than 1 wt. %, and most preferably less than 0.5 wt. %. Conventional methods such as hot air dryers may be used to evaporate the solvent before lamination. The drying conditions, such as temperature and air flow rate in the oven, for a desired solvent retention value depends on the nature of the solvent, the thickness of the cast film, the type of the release liner, and the web speed. The drying conditions should not be so aggressive to cause any surface defects in the cast film. Example defects are blisters (bubbles) and orange peel. Preferably, the drying oven system has multi-zones whose drying conditions are controlled separately.

The thickness of the dried photochromic polyurethane layer is from about 5 micrometers to about 150 micrometers. For using the photochromic laminate in an insert injection molding process to make plastic photochromic lenses, the thickness of the photochromic polyurethane is preferably between 5 micrometers and 80 micrometers. The thickness variation of the photochromic polyurethane layer should be controlled in order to produce a uniform light blockage at the activated state. A thickness variation of less than 15% over the width of the laminate is required and preferably less than 10% and more preferably less than 5%.

The transfer-lamination of the dried photochromic polyurethane film to two transparent resin sheets to form a laminate of the polyurethane film between the two resin sheets, may be done by either a sequential lamination process or an in-line lamination process. In a sequential lamination process, the dried polyurethane film on the release liner is first laminated to the first transparent resin sheet through a first lamination station. The semi-laminate consisting of the release liner, the polyurethane film, and the resin sheet, is then wound up on a core. The wind is then brought to a second lamination station where the release liner is peeled off and the second transparent sheet is laminated to the polyurethane film to form the final photochromic polyurethane laminate. The first and the second lamination stations may be the same one. The lamination may be conducted between two chrome coated steel rolls or between one steel roll and one rubber roll, although the later is preferred.

According to the findings of the inventors, an in-line lamination process is more preferred. In such a process, the second transparent resin sheet is immediately laminated to the semi-laminate without first winding the semi-laminate. The in-line lamination may be done with two two-roll lamination stations, or more conveniently be conducted on one three-roll setup in which the first roll and the second roll form a first nip, and the second roll and the third roll form a second nip. The dried polyurethane film on the release liner is first laminated to the first transparent resin sheet through the first nip. Without forming and winding a semi-laminate, the release liner is peeled off, and the second transparent resin sheet is immediately laminated to the exposed side of the polyurethane film on the first transparent resin sheet, through the second nip. This in-line lamination process will significantly increase the productivity. It also eliminates an extra winding step and reduces the possibilities of defects in the polyurethane film associated with the winding step. Example defects are delamination between the polyurethane film and the transparent resin sheet, impressions in the polyurethane film caused by possible external particles under winding pressure.

The photochromic polyurethane laminate thus formed according to the present invention needs to be cured before application. The curing is preferably carried in two stages: a) ambient curing for 1 day to 1 week, b) post curing at elevated temperature of from 50° C. to 130° C. for 8 hours to 1 week.

If the solvent selected to dissolve the photochromic polyurethane composition does not whiten the transparent resin sheet, a direct cast on the resin sheet may be employed. In this case, a simple two-roll lamination setup is acceptable for making a photochromic polyurethane laminate.

In an alternative process, the photochromic layer from a thermoplastic polyurethane and isocyanate-terminated polyurethane prepolymer may be co-extruded utilizing a single- or twin-screw extruder. The extruded photochromic polyurethane film will then be immediately hot-laminated between two transparent resin sheets to form the photochromic polyurethane laminate. The photochromic compounds and other additives may be incorporated into the polyurethane during the resin synthesis stage or melt-mixed prior to extrusion.

Although the photochromic laminate according to the present invention is especially suitable for making photochromic polycarbonate lenses through the insert injection molding process described in commonly assigned U.S. Pat. No. 6,328,446, it can also be used as-is for other photochromic transparencies such as goggles and face shields. The photochromic laminate may also be incorporated into other types of eyewear lenses such as cast resin lenses with a process described in U.S. Pat. No. 5,286,419.

The photochromic polyurethane laminate in accordance with the present invention will now be illustrated with reference to the following examples, which are not to be construed as a limitation upon the scope of the invention in any way.

In the examples, all values are expressions of weight %. CR49 and CR59 are tradenames of photochromic dyes available from Corning Corp. Grey-762 is proprietary grey photochromic dye. Irganox-1010 as an antioxidant, Tinuvin-144 and Tinuvin-765 as light stabilizers are available from CIBA (Tarrytown, N.Y., US).

To visually evaluate the activation and the photochromic polyurethane layer uniformity, a photochromic laminate or lens was exposed to UV irradiation (12 mw/m2) for 5 minutes.

Example 1

Preparation of Isocyanate Polyurethane Prepolymer A: In a 3-necked flask equipped with an overhead stirrer, thermocouple, and a vacuum adapter, 393.5 g (3 equivalents) of 4,4'-dicyclohexylmethanediisocyanate (H12MDI, available from Bayer as Desmodur W) was charged into the reactor and stirred at ambient temperature. 1000 g (2 equivalents) of a polycaprolactone diol having an OH number of 112 mg KOH/g and a number average molecular weight of about 1000 g/mole (available from Dow Chemical as Tone™ 2221) was preheated in an oven to 80° C. and added to the reactor. The mixture was allowed to stir for about 15 minutes, before adding 6 g of dibutyltin dilaurate catalyst (available from Air Products as T-12). The reaction flask was evacuated (<0.1 mm HG) and held at 90° C. for 6 hours. An aliquot of the prepolymer was withdrawn and titrated for isocyanate content using standard n-butyl amine titration. The isocyanate content was found to be 2.92% (theory; 3.0%).

Example 2

Preparation of Isocyanate Polyurethane Prepolymer B: In a 3-necked flask equipped with an overhead stirrer, thermocouple, and a vacuum adapter, 613.0 g (4.67 equivalents) of 4,4'-dicyclohexylmethanediisocyanate (H12MDI, available from Bayer as Desmodur W) was charged into the reactor and stirred at ambient temperature. 1000 g (2 equivalents) of a polycaprolactone diol having an OH number of 112 mg KOH/g and a number average molecular weight of about 1000 g/mole (available from Dow Chemical as Tone™ 2221) was preheated in an oven to 80° C. and added to the reactor. The mixture was allowed to stir for about 15 minutes, before adding 8 g of dibutyltin dilaurate catalyst (available from Air Products as T-12). The reaction flask was evacuated (<0.1 mm HG) and held at 90° C. for 6 hours. An aliquot of the prepolymer was withdrawn and titrated for isocyanate content using standard n-butyl amine titration. The isocyanate content was found to be 6.75% (theory; 7.0%).

Preparation of Thermoplastic Polyurethane: A thermoplastic polyurethane having a theoretical NCO index of 95 was prepared as following. The isocyanate prepolymer B (927.2 g) prepared in Example 2 was heated in vacuo (<0.1 mm HG) with stirring to 80° C. and 1,4-butane-diol (72.8 g) as the chain extender and 3 g of dibutyltin dilaurate catalyst were combined with the prepolymer while keeping stiring. The mixture was stirred for 30 seconds and subsequently poured into a Teflon lined tray. The tray containing the casting was cured in an oven at 85° C. for 24 hours.

Example 4

A solution was first made by dissolving 4 g of the thermoplastic polyurethane preaparated in Example 3 in 16 g of anhydrous tetrahydrofuran. To the solution was further added 4 g of the isocyanate prepolymer prepared in Example 1, 0.14 g of CR49 dye, 0.02 g CR59 dye, 0.17 g each of Irganox-1010, Tinuvin-144, and Tinuvin-765. The mixture was stirred at room temperature for 3 hours before cast on an easy release liner (available from CPFilms as T-50) with draw bar targeting a 38 micrometer dry film thickness. The solvent in the cast film was evaporated at 60° C. for 5 minutes with airflow above the film. The dried film was transfer-laminated between two 0.3 mm thick polycarbonate sheets (available from Teijin as PC-1151) with a bench top roller laminator. After 4 days under ambient, the laminate was cured at 70° C. for 3 days.

The laminate was cut into a 76 mm disc and used to make a segmented multi-focal polycarbonate photochromic lens. After the insert injection molding process with common molding parameters, the finished lens had an acceptable thin, crisp segment line. No polyurethane bleeding from the laminate was observed. The lens showed quick and uniform photochromic activation. No any lamination defects were observed.

Example 5

A solution having 28.2% solid, was first prepared by dissolving 1950 g of the thermoplastic polyurethane prepared as in Example 3 in 7550 g of anhydrous tetrahydrofuran. To the solution was further added 780 g of the isocyanate prepolymer prepared as in Example 1, 59 g each of "762" dye, Irganox-1010, Tinuvin-144, and Tinuvin-765. The mixture was stirred at room temperature for 3 hours then set overnight before cast on an easy release liner (available from Saint-Gobain as 8310) at a web speed of 5.5 feet per minute in a pilot coater equipped with a slot die, a two-zone drying oven, and a three-roll lamination station. The solvent in the cast film was evaporated at 70° C. for 1 minute and 120° C. for another minute with forced airflow above the film. The dried film was 38 micrometer thick and had a solvent retention of 0.1%. It was transfer-laminated between two 0.3 mm thick polycarbonate sheets (available from Teijin as PC-1151) with an in-line process (without winding the semi-laminate of the release liner, polyurethane film, and the first polycarbonate sheet). After 4 days in ambient (22° C. and 35%~50% RH), the laminate was cured at 70° C. for 3 days.

The laminate was cut into 76 mm discs and used to make a segmented multi-focal polycarbonate photochromic lenses. After the insert injection molding process with common molding parameters, the finished lens had an acceptable thin, crisp segment line. No polyurethane bleeding from the laminate was observed. The lens showed quick and uniform photochromic activation. No any lamination defects were observed.

Example 6

A solution having 35.3% solid, was first prepared by dissolving 1950 g of the thermoplastic polyurethane prepared as in Example 3 in 7742 g of anhydrous tetrahydrofuran. To the solution was further added 1950 g of the isocyanate prepolymer prepared as in Example 1, 68 g of CR49 dye, 10 g CR59 dye, 85 g each of Irganox-1010, Tinuvin-144, and Tinuvin-765. The mixture was stirred at room temperature for 3 hours then set overnight, then cast directly on a first 0.3 mm thick polycarbonate sheet (available from Teijin as PC1151) at a web speed of 5.5 feet per minute in a pilot coater equipped with a slot die, a two-zone drying oven, and a three-roll lamination station. The solvent in the cast film was evaporated at 94° C. for 1 minute and 127° C. for another minute with forced airflow above the film. The dried film was 25 micrometer thick and had a solvent retention of 0.1%. A second 0.3 mm thick polycarbonate sheet was laminated on the exposed side of the dried polyurethane film on the first polycarbonate sheet. After 4 days in ambient (22° C. and 35%~50% RH), the laminate was cured at 70° C. for 3 days. The laminate obtained was clear. No solvent whitening on the polycarbonate sheets was seen.

Comparison Example 1

To 10 g of Hysol® (Loctite) U-10FL urethane adhesive resin are dissolved 1.5% of "762" dye, 2.0% of Tinuvin 144, and 2.0% of Tinuvin 765. Then, 9.1 g of Hysol® U-10FL urethane adhesive hardener is mixed in to form a liquid adhesive.

The adhesive was coated with a draw bar directly on a polycarbonate sheet (0.3 mm thick, available from Teijin as 1151) to form a 38 micrometer cast film. Another polycarbonate sheet was laminated onto the adhesive through a bench top roller laminator. Some adhesive was squeezed out. The laminate was allowed to cure at room temperature overnight, then is post cured at 65° C. for 10 hours.

When the photochromic laminate was activated, thin spots (lightly activated due to thinner spots in the polyurethane layer) and non-uniformity of activation due to thickness gradient across the laminate were observed.

Comparison Example 2

Example 4 was followed, except the isocyanate prepolymer was neglected. The photochromic polyurethane layer was 38 micrometers thick. The laminate showed uniform photochromic activation. No lamination defects were observed. However, when molded into a polycarbonate lens as in Example 4, severe polyurethane bleeding was observed at the edge of the laminate.

The foregoing detailed description of the preferred embodiments of the invention has been provided for the purposes of illustration and description. They are not intended to be exhaustive or to limit the invention to the precise embodiments disclosed. Many modifications and variations will be apparent to practitioners skilled in the art to which this invention pertains. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A photochromic polyurethane laminate for use in an optical article comprising:
    a first resin sheet;
    a second resin sheet; and
    a photochromic polyurethane layer having a top side attached to said first resin sheet and a bottom side attached to said second resin sheet, said photochromic polyurethane layer prepare from a composition comprising:
        a solid thermoplastic polyurethane prepared from a composition comprising at least one diisocyanate selected from a group consisting of: aliphatic diisocyanate and cycloaliphatic diisocyanate;
        at least one isocyanate-terminated polyurethane prepolymer; and
        at least one photochromic compound;
    wherein said photochromic polyurethane laminate has a molecular structure resulting from curing said laminate within a temperature range from about 50 degrees Celsius to about 130 degrees Celsius.

2. A photochromic polyurethane laminate according to claim 1, wherein said solid thermoplastic polyurethane, having a molecular weight in the range of about 9,000 to 100,000 g/mole, is obtained by reacting
    a) a polyol selected from a group consisting of polyester polyols and polyether polyols, having a molecular weight in the range of about 500 to 6,000 g/mol, and a functionality of 2;
    b) with said diisocyanate in an equivalent ratio of diisocyanate to polyol in the range of about 1.2:1.0 to 8.0:1.0;
    c) with a diol as a chain extender having a molecular weight in the range of about 62 to 499 g/mol, the theoretical NCO index calculated by multiplying 100 to the equivalent ratio of isocyanate groups to the sum of the hydroxyl groups of polyol and diol being within a range of about 90 to 105.

3. A photochromic polyurethane laminate according to claim 1, wherein said isocyanate-terminated polyurethane prepolymer, having a molecular weight in the range of about 1,000 to 6,000 g/mole, is obtained by reacting
    a) a polyol selected from a group consisting of polyester polyols and polyether polyols, having a molecular weight in a range of about 500 to 3000 g/mol and a functionality of 2;
    b) with an aliphatic diisocyanate, a cycloaliphatic diisocyanate, or both, in an equivalent ratio of diisocyanate to polyol in a range of about 1.2:1.0 to 8.0:1.0.

4. A photochromic polyurethane laminate according to claim 1, wherein said photochromic compound is selected from the group consisting essentially of benzopyrans, naphthopyrans, spirobenzopyrans, spironaphthopyrans, spirobenzoxzines, spironaphthoxazines, fulgides and fulgimides.

5. A photochromic polyurethane laminate according to claim 1, wherein the resin material for said resin sheets are selected from a group consisting of polycarbonates, cycloolefin (co)polymers, polymers from acrylate derivatives, cellulose acetate butyrate, cellulose triacetate.

6. A photochromic polyurethane laminate according to claim 2, wherein said polyester polyol is selected from a group consisting of polycaprolactone polyol and poly(butylene adipate) polyol.

7. A photochromic polyurethane laminate according to claim 2, wherein said polyether polyol is selected from a group consisting of polypropylene glycol and polytetramethylene glycol.

8. A photochromic polyurethane laminate according to claim 2, wherein said diisocyanante is selected from a group consisting of hexamethylene diisocyanate, isophorone diisocyanate, cyclohexane diisocyanate, methylcyclohexane diisocyanate, and dicyclohexylmethane diisocyanate.

9. A photochromic polyurethane laminate according to claim 2, wherein said diol is selected from a group consisting of propane diol, butane diol, pentane diol, hexane diol, diethylene glycol, dipropylene glycol, and cyclohexane diol.

10. A photochromic polyurethane laminate according to claim 3, wherein said polyester polyol is selected from a group consisting of polycaprolactone polyol and poly(butylene adipate) polyol.

11. A photochromic polyurethane laminate according to claim 3, wherein said polyether polyol is selected from a group consisting of polypropylene glycol and polytetramethylene glycol.

12. A photochromic polyurethane laminate according to claim 3, wherein said diisocyanante is selected from a group consisting of hexamethylene diisocyanate, isophorone diisocyanate, cyclohexane diisocyanate, methylcyclohexane diisocyanate, and dicyclohexylmethane diisocyanate.

13. A photochromic polyurethane laminate according to claim 1, wherein said photochromic polyurethane layer has a thickness in a range of about 10 μm to about 100 μm.

14. A photochromic polyurethane laminate according to claim 4, wherein said photochromic compound is selected from the group consisting essentially of naphtho[2,1b]pyrans and naphtho[1,2b]pyrans.

15. A photochromic polyurethane laminate according to claim 1, wherein the mixing ratio of said thermoplastic polyurethane to said isocyanate-terminated polyurethane prepolymer is in a range of about 9:1 to 1:9, by weight.

16. A photochromic polyurethane layer for use in an optical laminate prepared from a mixture comprising:
    a solid thermoplastic polyurethane prepared from a composition comprising at least one diisocyanate selected from a group consisting of: aliphatic diisocyanate and cycloaliphatic diisocyanate;
    at least one isocyanate-terminated polyurethane prepolymer; and
    at least one photochromic compound.

17. The photochromic polyurethane layer of claim 16 wherein said solid thermoplastic polyurethane, having a molecular weight in the range of about 9,000 to 100,000 g/mole, is obtained by reacting
    a) a polyol selected from a group consisting of polyester polyols and polyether polyols, having a molecular weight in the range of about 500 to 6,000 g/mol, and a functionality of 2;
    b) with said diisocyanate in an equivalent ratio of diisocyanate to polyol in the range of about 1.2:1.0 to 8.0:1.0;
    c) with a diol as a chain extender having a molecular weight in the range of about 62 to 499 g/mol, the theoretical NCO index calculated by multiplying 100 to the equivalent ratio of isocyanate groups to the sum of the hydroxyl groups of polyol and diol being within a range of about 90 to 105.

18. The photochromic polyurethane layer of claim 16 wherein the isocyanate-terminated polyurethane prepolymer, having a molecular weight in the range of about 1,000 to 6,000 g/mole, is obtained by reacting
    a) a polyol selected from a group consisting of polyester polyols and polyether polyols, having a molecular weight in a range of about 500 to 3000 g/mol and a functionality of 2;
    b) with an aliphatic diisocyanate, a cycloaliphatic diisocyanate, or both, in an equivalent ratio of diisocyanate to polyol in a range of about 1.2:1.0 to 8.0:1.0.

19. The photochromic polyurethane layer of claim 16 wherein the layer has a thickness between 5 micrometers and 80 micrometers.

20. The photochromic polyurethane layer of claim 16 wherein the layer has a variation in thickness of less than 15 percent.

* * * * *